United States Patent

[11] 3,582,817

[72] Inventor Verle A. Gilson
 Livermore
[21] Appl. No. 823,887
[22] Filed May 12, 1969
[45] Patented June 1, 1971
[73] Assignee The United States of America as
 represented by the United States Atomic
 Energy Commission

[54] GAS LASER HAVING EXCITATION CHAMBERS
 3 Claims, 1 Drawing Fig.
[52] U.S. Cl. ............................................. 331/94.5
[51] Int. Cl. ............................................. H01s 3/09
[50] Field of Search ................................. 331/94.5;
 250/199; 330/4.3

[56] References Cited
 UNITED STATES PATENTS
 3,460,053 8/1969 Leonard ...................... 331/94.5
 3,469,207 9/1969 Solomon et al. ............. 331/94.5

Primary Examiner—William L. Sikes
Attorney—Roland A. Anderson

ABSTRACT: A laser apparatus including means for providing an axial magnetic field, and a plurality of electrodes within the laser cavity defining multiple axially adjacent excitation chambers or sections. Each excitation chamber or section is formed by two spaced parallel annular cathodes of equal radius with a coaxial tubular anode therebetween. Successive chambers may share common cathodes so that the apparatus has alternately spaced cathodes and anodes. A potential difference applied between the anodes and cathodes causes electrons to make spiraling paths and undergo high frequency oscillations along axial magnetic field lines causing comparatively long electron lifetimes within each chamber, thereby increasing the probability of exciting particles contained therein. A high fraction of the gas particles contained in the laser cavity are excited to lasing levels by collisions between the electrons and the gas particles, thereby producing a high system efficiency which as a lower threshold current which thus allows for the use of smaller power supplies than for prior known lasers of comparable power output.

PATENTED JUN 1 1971
3,582,817
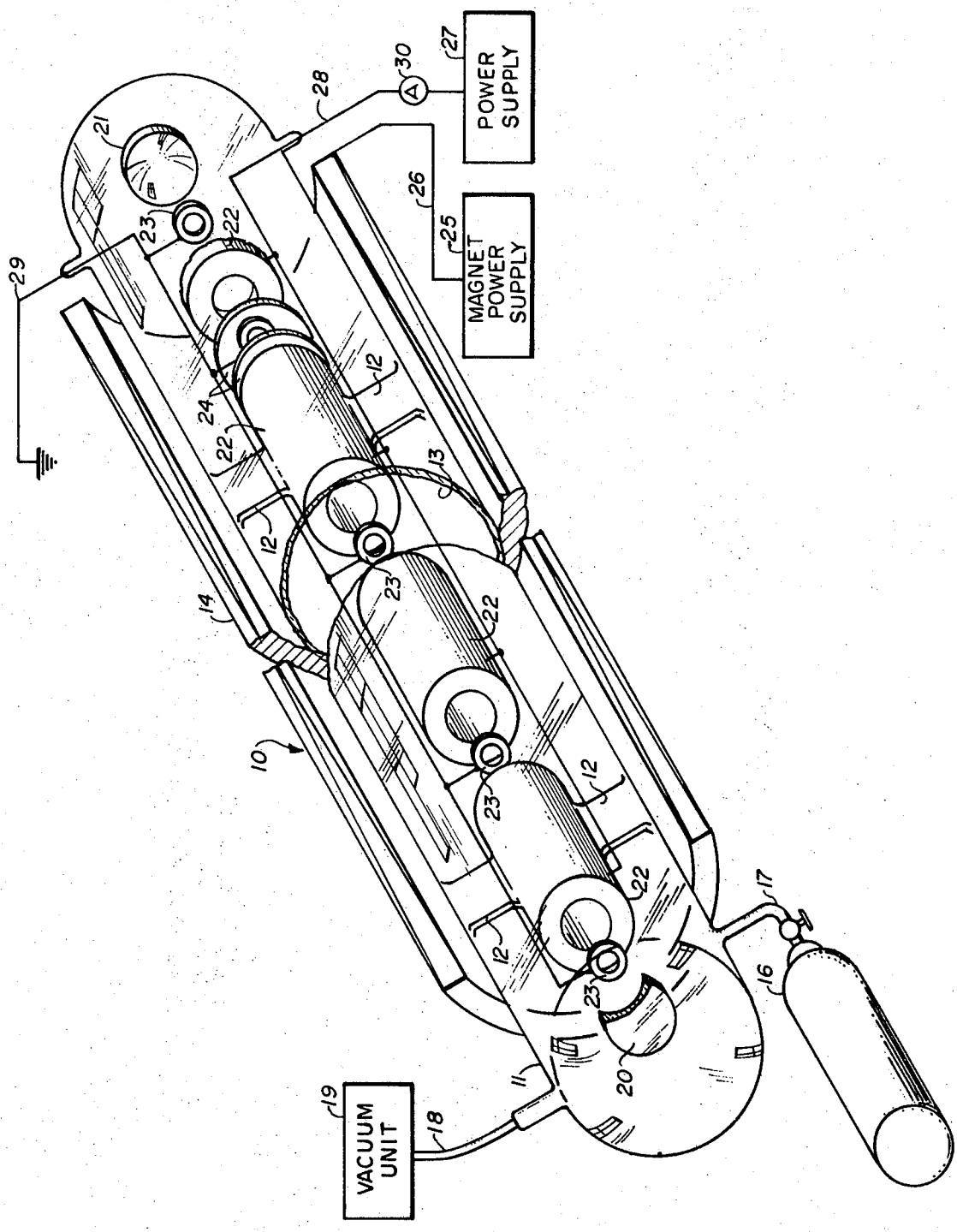
INVENTOR.
VERLE A. GILSON
BY
ATTORNEY

GAS LASER HAVING EXCITATION CHAMBERS

BACKGROUND OF THE INVENTION

The invention described herein was made in the course of, or under, Contract No. W-7405-ENG-48, with the United States Atomic Energy Commission.

In prior known gas lasers, lasing occurred at relatively high current thresholds. A substantial amount of power was dissipated even before these lasers began operating. Even after operation commenced, the amount of input power wasted has been on the order of kilowatts in the argon ion laser, for example.

SUMMARY OF THE INVENTION

Compared to lasers of comparable size, the present laser excitation system has a threshold current at least two orders of magnitude lower than the prior devices (argon ion laser, for example). This is accomplished by a novel internal electrode structure based on the Penning-type discharge described, for example, in "Controlled Thermonuclear Reactions" by Glasstone and Lovberg, 1960, on pages 152 and 153. Thus, the present invention provides a novel laser excitation apparatus which greatly increases the gas excitation efficiency which can be employed with any lasing gas or gases (that are not suppressed by the presence of the magnetic field), thereby producing a family of gas lasers characterized by high efficiency.

Therefore it is an object of this invention to provide a laser excitation apparatus having a high power output and low threshold current.

A further object of the invention is to provide a laser excitation apparatus utilizing a plurality of adjacent excitation chambers within a laser cavity wherein electrons undergo high frequency oscillations with spiraling motions along axial field lines within each chamber for exciting particles contained therein.

Another object of the invention is to provide a high efficiency laser excitation apparatus having a unique internal electrode structure applicable with any lasing gas or gases.

Other objects of the invention will become readily apparent from the following description and accompanying drawing.

BRIEF DESCRIPTION OF THE DRAWING

The single FIGURE is a partially cutaway and partially exploded view of an embodiment of the invention.

DESCRIPTION OF THE INVENTION

As gas laser incorporating the inventive excitation apparatus is generally indicated at 10 and includes a magnetically permeable enclosure or envelope 11 defining a vacuum cavity or chamber 13 therein, the enclosure or envelope 11 being partially surrounded by a solenoid 14 mounted in spaced relationship therewith. For example, enclosure 11 may be constructed of glass. The enclosure or envelope 11 defining a chamber or cavity 13 is connected to a gas supply 16, such as argon, through conduit or line 17 which extends in sealed relationship through enclosure 11. A line or conduit 18 sealed in enclosure 11 is adapted to be connected to a vacuum pump 19, or other suitable means, for evacuating chamber or cavity 13. If desired, the outer enclosure 12 can be eliminated for certain applications. Positioned at each end of the enclosure or envelope 11 is a pair of semitransparent reflectors or mirrors 20 and 21, which, for example, may have a reflectivity characteristic of greater than 95 percent. Mirrors 20 and 21 are mounted on the longitudinal axis of enclosure 11 and are coaxially aligned with a plurality of tubular anodes 22 and apertured cathodes 23 supported within enclosure chamber or cavity 13, by support means 12 which are secured to or integral with enclosure 11, for example, a cathode 23 being positioned at each end of each of the anodes 22. Only two pairs of support means 12 are shown for clarity and, for example, may also be constructed of glass. Anodes and cathodes 22 and 23 may, for example, be constructed of either copper or molybdenum. The tubular anodes 22 have a larger inner diameter than the cathodes 23. Each pair of the cathodes 23 with the intermediate anode 22 form an excitation chamber. Successive excitation chambers share one common cathode 23. The chambers are adapted to economically use the majority of gas particles provided therein. Positioned intermediate a cathode 23 and its adjacent anode 22, both sides in some instances, is an insulator spacer or member 24, only two being shown, which serves to prevent arcing between the gap separating the cathodes 23 and anodes 22. However, the gap can be made narrow enough to prevent arcing according to the popular Paschen's law and thus eliminate spacers 24. Also this spacer can be a void space in some instances. In actual practice the anodes 22, cathodes 23 and insulator spacers 24 are in abutment one with another, and not separated to the extent illustrated in the drawing. Solenoid 14 is electrically connected to a magnet power supply 25 as indicated by lead 26. Anodes 22 are electrically connected in parallel with a high voltage power supply 27 as shown by lead 28, while cathodes 23 are connected in parallel by lead 29 to ground as indicated by conventional legend, whereby a potential difference is provided therebetween. An ammeter 30 is positioned in anode lead 28 for indicating the current flowing therethrough.

The operation, assuming that cavity or chamber 13 has been previously pumped down or evacuated prior to connection of gas supply 16 therewith by vacuum unit 19, is as follows.

Gas from supply 16 is introduced through line 17 into the cavity 13 of enclosure or envelope 11 at a low pressure, for example, about 15 microns. Electrodes (anodes and cathodes) 22 and 23 and solenoid 14 are energized by their respective power supplies 27 and 25. Free electrons which are present rapidly accelerate toward anodes 22 within the excitation chambers defined by cathodes 23 bracketing anodes 22. Rather than hitting the anode directly, the high voltage electrons tend to spiral about the axial magnetic field lines traveling along their original direction of acceleration. When the electrons experience the relatively negative potential of a cathode in their path, they reverse their direction, following the magnetic field lines toward the opposite cathode, then reverse again, etc. Hence, electrons tend to oscillate in a spiral path at high velocities between cathodes, vastly increasing the probability that gas excitation by a collision will occur. When collisions between gas particles and electrons slow the electrons, they tend to drift radially until they are collected at an anode 22. The behavior of the discharge is very complex in this pressure range, however, this description is adequate from a simplified viewpoint. Meanwhile, the gas particles have received excitation necessary to "pump" them to an energy state appropriate for lasing, this being enhanced by mirrors 20 and 21 as known in the art. The gas particles may either become ionized or merely assume a nonionic excited state, depending on the gas selected, voltage applied, geometric dimensions, etc. In all cases, ions appear within the excitation chambers, tending to move toward cathodes 23 upon acceleration by the local anode-cathode electric field. The relative number of ions and electrons is nearly equal so that a plasma exists in the laser cavity 13 of enclosure 11. Accordingly, gas particle excitation occurs without inhibition due to space charge buildup. Enhanced excitation produces a light beam which, depending on the reflectivity characteristics of the mirrors 20 and 21 is retained within cavity 13 along the axis of the cavity enclosure, which is typical of most gas laser optical cavities, the beam being low cost, compared to prior devices of the same size, due to the novel electrode structure.

In an argon ion laser built in accord with the above described invention, the threshold current necessary before lasing occurred was low, i.e., only 15 milliamps, with a 700-volt power supply 27. A similarly supplied argon ion laser of the prior art consumes a threshold current of 2.5 amps.

It is thus seen that the present invention provides an improved excitation apparatus for gas laser, thereby introducing a family of gas lasers characterized by high efficiency gained through a structure of electrodes spaced within the laser cavity, combined with an axial magnetic field extending along the length of the laser cavity.

While a particular embodiment of the invention has been illustrated and described, modifications will become apparent to those skilled in the art, and it is intended to cover in the appended claims all such modifications as come within the spirit of the invention.

I claim:

1. A gas laser excitation apparatus having a low threshold current comprising: a sealed enclosure defining a laser cavity therein, means for supplying a lasing gas to said cavity, reflector means positioned at opposite ends of said enclosure, means positioned about at least a portion of said enclosure for providing an axial magnetic field within said cavity, a plurality of tubular anodes and a plurality of apertured cathodes coaxially positioned in said cavity, said anodes having a larger interior diameter than said cathodes, an insulative spacer means positioned intermediate to said cathodes and adjacent anodes, each of said anodes being positioned intermediate a pair of said cathodes, each of said anodes sharing a cathode positioned therebetween, each pair of said cathodes on an intermediate anode forming an excitation chamber, each of said reflector means, said anodes and said cathodes being aligned along a longitudinal axis of said enclosure, support means for said anodes and cathodes positioned within said sealed enclosure, and power supply means operatively connected to said magnetic field providing means and to said plurality of anodes and cathodes, each of said anodes and each of said cathodes being electrically connected in parallel so as to produce a potential difference therebetween.

2. The gas laser excitation apparatus defined in claim 1, additionally including means operatively connected to said sealed enclosure for evacuating same.

3. The gas laser excitation apparatus defined in claim 1, wherein said sealed enclosure is constructed of glass, wherein said lasing gas is argon, and wherein said anodes and cathodes are constructed of material selected from the group consisting of copper and molybdenum.